(12) United States Patent
Shinomiya

(10) Patent No.: US 7,882,166 B2
(45) Date of Patent: Feb. 1, 2011

(54) INTER-COMPUTER DATA TRANSFER METHOD AND INTER-COMPUTER NETWORK SYSTEM

(75) Inventor: Kiyoshi Shinomiya, Tokyo (JP)

(73) Assignee: NEC Corporation, Tokyo (JP)

( * ) Notice: Subject to any disclaimer, the term of this patent is extended or adjusted under 35 U.S.C. 154(b) by 1795 days.

(21) Appl. No.: 10/781,878

(22) Filed: Feb. 20, 2004

(65) Prior Publication Data

US 2004/0215800 A1 Oct. 28, 2004

(30) Foreign Application Priority Data

Feb. 21, 2003 (JP) ............... 2003-044198

(51) Int. Cl.
*G06F 15/16* (2006.01)
(52) U.S. Cl. ............... 709/200; 711/3; 711/118; 711/202
(58) Field of Classification Search ........... 709/205, 709/206, 212–216, 200; 711/210, 203
See application file for complete search history.

(56) References Cited

U.S. PATENT DOCUMENTS

| 4,951,278 | A | * | 8/1990 | Biber et al. | ........... | 370/474 |
| 5,497,480 | A | * | 3/1996 | Hayes et al. | ........... | 711/166 |
| 5,808,886 | A | | 9/1998 | Suzuki | | |
| 5,887,134 | A | * | 3/1999 | Ebrahim | ........... | 709/200 |
| 6,345,352 | B1 | * | 2/2002 | James et al. | ........... | 711/210 |
| 7,395,283 | B1 | * | 7/2008 | Atzmony et al. | ........... | 707/204 |
| 2003/0177335 | A1 | * | 9/2003 | Luick | ........... | 711/210 |
| 2004/0221127 | A1 | * | 11/2004 | Ang | ........... | 711/203 |

FOREIGN PATENT DOCUMENTS

| JP | 5-089056 | | 4/1993 |
| JP | 5-89056 | A | 4/1993 |
| JP | 7-262146 | A | 10/1995 |
| JP | 2000115197 | A * | 4/2000 |
| JP | 2000-330960 | A | 11/2000 |
| JP | 3237599 | A | 10/2001 |
| JP | 2002-259213 | A | 9/2002 |
| JP | 2002-366427 | A | 12/2002 |
| JP | 2003-050743 | A | 2/2003 |

OTHER PUBLICATIONS

Translated Abstract JP 2000115197 A, published Apr. 21, 2000.*

* cited by examiner

*Primary Examiner*—Dustin Nguyen
(74) *Attorney, Agent, or Firm*—Foley & Lardner LLP

(57) ABSTRACT

A data transfer method for a network system wherein a plurality of computers are connected to each other through a switched network is improved in terms of the TLB hit ratio. Each of the computers includes a main storage device, a processor for issuing a communication process command and a communication device for processing the communication command from the processor and communicating with another one of the computers through a switched network. The communication device includes a transmission section and a reception section each of which includes a TLB for retaining a plurality of TLB entries. When a communication command including information of that one of the computers which is a sending source is issued from the processor, the reception section determines that one of the TLB entries which is to be used in accordance with the computer of the sending source.

15 Claims, 13 Drawing Sheets

FIG. 8

| COMMAND | DESTINATION | PACKET NUMBER |
|---|---|---|
| COMMUNICATION COMMAND 1 | 400b | 5 |
| COMMUNICATION COMMAND 2 | 400b | 3 |
| COMMUNICATION COMMAND 3 | 400b | 3 |
| COMMUNICATION COMMAND 4 | 400b | 1 |

FIG. 9

| TRANSMISSION TURN NUMBER | COMMUNICATION COMMAND | COMMUNICATION PACKET | COMMUNICATION PACKET INTERNAL COMMAND IDENTIFICATION NUMBER | LAST PACKET IN COMMUNICATION COMMAND |
|---|---|---|---|---|
| 1 | COMMUNICATION COMMAND 1 | COMMUNICATION PACKET 1-1 | 1 | NO |
| 2 | COMMUNICATION COMMAND 1 | COMMUNICATION PACKET 1-2 | 1 | NO |
| 3 | COMMUNICATION COMMAND 2 | COMMUNICATION PACKET 2-1 | 2 | NO |
| 4 | COMMUNICATION COMMAND 2 | COMMUNICATION PACKET 2-2 | 2 | NO |
| 5 | COMMUNICATION COMMAND 1 | COMMUNICATION PACKET 1-3 | 1 | NO |
| 6 | COMMUNICATION COMMAND 2 | COMMUNICATION PACKET 2-3 | 2 | Yes |
| 7 | COMMUNICATION COMMAND 3 | COMMUNICATION PACKET 3-1 | 2 | NO |
| 8 | COMMUNICATION COMMAND 1 | COMMUNICATION PACKET 1-4 | 1 | NO |
| 9 | COMMUNICATION COMMAND 1 | COMMUNICATION PACKET 1-5 | 1 | Yes |
| 10 | COMMUNICATION COMMAND 3 | COMMUNICATION PACKET 3-2 | 2 | NO |
| 11 | COMMUNICATION COMMAND 4 | COMMUNICATION PACKET 4-1 | 1 | Yes |
| 12 | COMMUNICATION COMMAND 3 | COMMUNICATION PACKET 3-3 | 2 | Yes |

FIG. 14

| TRANSMISSION TURN NUMBER | COMMUNICATION COMMAND | COMMUNICATION PACKET | COMMUNICATION PACKET INTERNAL COMMAND IDENTIFICATION NUMBER | LAST PACKET IN COMMUNICATION COMMAND |
|---|---|---|---|---|
| 1 | COMMUNICATION COMMAND 1 | COMMUNICATION PACKET 1-1 | 1 | NO |
| 2 | | COMMUNICATION PACKET 1-2 | 1 | NO |
| 3 | | COMMUNICATION PACKET 1-3 | 1 | NO |
| 4 | | COMMUNICATION PACKET 1-4 | 1 | NO |
| 5 | | COMMUNICATION PACKET 1-5 | 1 | Yes |
| 6 | COMMUNICATION COMMAND 2 | COMMUNICATION PACKET 2-1 | 2 | NO |
| 7 | | COMMUNICATION PACKET 2-2 | 2 | NO |
| 8 | | COMMUNICATION PACKET 2-3 | 2 | Yes |
| 9 | COMMUNICATION COMMAND 3 | COMMUNICATION PACKET 3-1 | 2 | NO |
| 10 | | COMMUNICATION PACKET 3-2 | 2 | NO |
| 11 | | COMMUNICATION PACKET 3-3 | 2 | Yes |
| 12 | COMMUNICATION COMMAND 4 | COMMUNICATION PACKET 4-1 | 1 | Yes |

INTER-COMPUTER DATA TRANSFER METHOD AND INTER-COMPUTER NETWORK SYSTEM

BACKGROUND OF THE INVENTION

1. Field of the Invention

The present invention relates to an inter-computer network system wherein a plurality of computers parallelly execute processing of individual jobs thereof while communicating with each other and an inter-computer data transfer method for a computer system.

2. Description of the Related Art

As a result of popularization of system area networks, distributed computing systems have been and are increasing wherein a plurality of computers are connected to each other by a high speed network and parallelly execute processing of individual jobs thereof while communicating with each other.

The parallel processing by a plurality of computers makes it possible to execute a large scale arithmetic operation process which cannot be implemented by a single computer. Also the High Performance Fortran (HPF) which is a standard program language for programming or the Message Passing Interface (MPI) which is a library where a plurality of computers perform arithmetic operation while communicating with each other has been developed, and the parallel processing is used in a progressively increasing wide region and computers having the function are increasing.

Where a plurality of computers are connected to each other by a network and execute parallel processing through mutual communication, at least an arithmetic operation process of performing an actual arithmetic operation and a communication process of performing communication with another computer are required.

When a communication process is performed, if a processor performs the communication process, then the arithmetic operation capacity of the processor is deteriorated by the communication process. In order to use the arithmetic operation capacity of the processor for the arithmetic operation as much as possible, a communication device is sometimes incorporated while removing the communication process from the processor.

The communication device processes a communication instruction from the processor and transfers data of a sending source designated by the communication instruction to a destination designated by the communication instruction. The communication instruction usually designates a sending source address which is an address on a main storage of sending source data, a transfer length which is a length of the data to be transferred and a computer of the sending destination.

The designations of the sending source address, transfer length and sending destination computer in the communication instruction are called Send command. In addition, the designation of a sending destination address which is a main storage address of the sending destination is called Remote DMA Write command.

If the address on the main storage designated by the communication instruction is a physical address, then a process of forwarding the communication instruction to the communication processing apparatus is limited to a privileged process to which a physical address can be known. When a user level process which is a non-privileged process performs a communication process, it issues a request for communication to a privileged process, and the privileged process executes a process of converting a logical address into a physical address by proxy through a process switch. Since such a process switch process as just described requires a very long period of time as viewed from the user process, the process switch process makes one of factors of performance degradation.

In order to prevent the performance degradation by the process switch process described above, the communication device incorporates an address conversion mechanism for converting a logical address into a physical address so that the user process can issue a communication instruction to the communication device without intervention of a privileged process. This is called user level communication and is implemented by a network apparatus for which communication of a high performance with a low latency is required.

When the address conversion mechanism is incorporated, a method is adopted wherein an address conversion table is fully incorporated in the communication device. However, where the address conversion table cannot be incorporated in the communication device, another method is adopted wherein the address conversion table is incorporated in a memory outside the communication device and part of the address conversion table is incorporated as a translation look aside buffer (TLB) in the communication device.

Usually, the following three methods are available to incorporate a TLB:

(1) Full associative method wherein a conversion object logical address is used for comparison of part of logical addresses of all TLB entries and a TLB entry which exhibits coincidence is used for address conversion;

(2) Direct map method wherein some of bits of a conversion object logical address are used as an address of a TLB entry to be used for conversion; and (3) Set associative method wherein a set of some TLB entries are selected from among all TLBs using some of bits of a conversion object logical address and the logical addresses in all of the TLB entries in the selected set and the conversion object logical address are compared with each other.

In all of the methods described, a conversion object logical address is used for determination of a TLB entry.

Where a method wherein a TLB is incorporated is adopted, the hit ratio of the TLB has a significant influence on the transfer performance. Therefore, it is expected to raise the hit ratio of the TLB incorporated in the communication device.

A communication device which performs address conversion is disclosed, for example, in Japanese Patent Laid-Open NO. 89056/1993 (hereinafter referred to as Patent Document 1), Japanese Patent Laid-Open No. 262146/1995 (hereinafter referred to as Patent Document 2) and Japanese Patent No. 3,237,599 (hereinafter referred to as Patent Document 3). Patent Document 1 discloses an apparatus wherein a shared memory which performs address conversion is accessed through communication control.

Patent Document 2 discloses another apparatus wherein address conversion is performed by a router and inter-processor communication is performed using a packet. Patent Document 3 discloses a further apparatus wherein address conversion is performed in a processor.

As described hereinabove, where a communication device according to the TLB method is incorporated in a computer in order to implement parallel processing using a plurality of computers, improvement of the hit ratio of a TLB is a significant subject.

As described above, in order to incorporate a TLB in a communication device, usually the direct map method, set associative method or full associative method is used wherein a logical address of an object of conversion and logical addresses in TLB entries are compared with each other.

According to the three methods, a TLB entry to be used for conversion is determined based on a conversion object logical address. Further, since the number of TLB entries is smaller than the size of the address conversion table, replacement of a TLB entry is performed when a miss occurs with the TLB and besides the TLB does not include a free entry.

Since the logical addresses used by a processor have a high locality and exhibit such a behavior that there is a high degree of possibility that a logical address used recently may be used again, the Least Recently Used algorithm (LRU), that is, an algorithm which replaces a TLB which has been least used recently is used frequently as an algorithm for the replacement.

In data transfer, however, the write object address in most cases increases monotonously, and the main storage address indicates a behavior much different from the behavior in accessing of the processor that the possibility that a main storage address used in the past may be re-utilized is low. Therefore, there is a first problem that, if the LRU is used as the replacement algorithm for a TLB entry, then the TLB hit ratio is dropped thereby.

Further, since a TLB held by a reception section of a communication device is used for communication with a plurality of opposite parties, if a TLB entry which is used only with a logical address is used, then all of the TLB entries of the reception section of the communication device are used in response to data transfer from a transmission apparatus of one opposite party of communication and replace those TLB entries which have been used by data communication of transmission apparatus of other opposite parties of communication. Therefore, there is a second problem that the TLB hit ratio is dropped thereby.

SUMMARY OF THE INVENTION

It is an object of the present invention to provide a method by which the hit ratio of a TLB which is incorporated in a communication device and serves as an address conversion device for implementing user level communication in an inter-computer network system wherein each of a plurality of computers communicate with another computer through a communication device thereof is improved and the apparatus can be used efficiently.

In order to attain the object described above, according to an aspect of the present invention, there is provided an inter-computer data transfer method for transferring data between a plurality of computers each including a main storage device, a processor for issuing a communication process command and a communication device for processing the communication command from the processor and communicating with another one of the computers through a switched network, comprising the step of, each of a transmission section and a reception section of the communication device including a translation look aside buffer for retaining a plurality of translation look aside buffer entries, determining, when a communication command including information of that one of the computers which is a sending source is issued from the processor, one of the translation look aside buffer entries which is to be used in accordance with the computer of the sending source by means of the reception section.

According to another aspect of the present invention, there is provided an inter-computer network system, comprising a plurality of computers connected to each other through a switched network, each of the computers including a main storage device, a processor for issuing a communication processing command, and a communication device for processing the communication command from the processor and communicating with another one of the computers through the switched network, the communication device including a transmission section for transmitting a communication to the switched network and a reception section for receiving a communication from the switched network, each of the transmission section and the reception section including a translation look aside buffer for retaining a plurality of translation look aside buffer entries, the processor issuing the communication command which includes information of that one of the computers which is a sending source, the reception section determining one of the translation look aside buffer entries which is to be used in accordance with the computer of the sending source.

In both of the inter-computer data transfer method and the inter-computer network system, the transmission section may produce a communication packet including the information of the computer of the sending source and transmit the communication packet to another one of the computers.

The communication apparatus may limit the number of communication commands to be processed simultaneously to the same destination computer from the computer of the sending source. By the configuration, different transmissions can be made overlap with each other and a high translation look aside buffer hit ratio can be achieved.

The inter-commuter network system may be configured such that the communication apparatus applies an identification number of a processing command in the computer of the sending source to a communication packet, and the reception section uses the same translation look aside buffer entry for different communication packets which have the same identification number of the processing command. By the configuration, a translation look aside buffer entry selection logic to be used by the reception section can be simplified.

The inter-computer network system may be configured such that the transmission section of the communication device extracts a communication command from the main storage device in accordance with an instruction from the processor, converts a logical address of data of the sending source in the communication command into a physical address, extracts transmission data from the main storage device, produces a communication packet from the extracted data and the communication command and transmits the communication packet to the destination computer.

The reception section of the communication device may receive a communication packet from the switched network, convert a destination logical address into a destination physical address for the main storage device and write data in the communication packet into the destination physical address.

The communication packet may include a command code for setting a communication command, a destination computer number for setting a destination computer number for the communication command, a process number representative of a process of a communication opposite party for setting the destination process number of the communication command, a destination logical address representative of a writing destination of the data in the destination process for setting the destination logical address for the packet, a data length for setting a length of data of the packet, a sending source computer number for identification of a sending source for setting a sending source computer number of the communication command, and data to be written into the destination.

In the inter-computer data transfer method and the inter-computer network system, in order to raise the hit ratio of a translation look aside buffer (hereinafter referred to as TLB) incorporated in a reception section of a communication device of a computer, the TLB of the reception section of the communication device retains one entry or a plurality of TLB entries for exclusive use independently for each of sending source computers of a communication request for a TLB entry. When a destination logical address from the same sending source misses on the TLB and the TLB entry or entries assured exclusively for the sending source computer are not free, only the TLB entry or entries exclusively for the sending source computer are determined as a rewriting object.

Consequently, unintended driving out of a TLB entry by a communication from another sending source can be prevented, and besides, a replacement object of the TLB can be selected readily.

Further, the sending source computer of a communication request limits the simultaneous process command number for communication commands to the same destination computer to a number smaller than a prescribed number and a number of TLB entries greater than the simultaneous process command number are incorporated in the communication device on the reception side and besides a TLB entry or entries are allocated exclusively for each communication command. Consequently, when a plurality of communication packets transmitted based on a plurality of communication commands are received from a plurality of sending source computers, the possibility that driving out of a TLB entry being used in the communication may occur is reduced, and the TLB hit ratio is improved.

With the inter-computer data transfer method and the inter-computer network system, since entries of a TLB are allocated independently of each other to communication packets from a plurality of sending sources, there is an advantage that a TLB entry is not driven out by a destination logical address of a communication packet from a different sending source communication device.

Further, where the number of communication commands to be processed simultaneously from a sending source computer of communication packets to the same destination computer is to be limited, it is possible for the reception side of the communication packets to suppress the number of TLB entries to be retained for one sending source to a number smaller than the limitation number and retain a number of TLB entries equal to the simultaneous process command number. Consequently, TLB entries corresponding to the communication commands being transmitted from the sending source computer continue to always be retained, and there is an advantage that the TLB hit ratio is raised.

Where a process command identification number of the sending source communication device is applied to a communication packet to designate a TLB entry to be used by the reception section, one communication command being processed by the sending source communication apparatus always uses the same TLB entry, and besides, the possibility that the destination logical address of one communication command in data transfer may increase monotonously is high. Consequently, there is an advantage that a sending source can cause processing of a plurality of communication commands to the same destination to be executed and besides the TLB hit ratio is improved.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 8 is a diagrammatic view illustrating examples of a processing command of a communication device of the computer system;

FIG. 9 is a diagrammatic view illustrating an example of transmission of packets by the communication device;

FIG. 14 is a diagrammatic view illustrating contents of the page table;

DESCRIPTION OF THE PREFERRED EMBODIMENT

Figure 1:
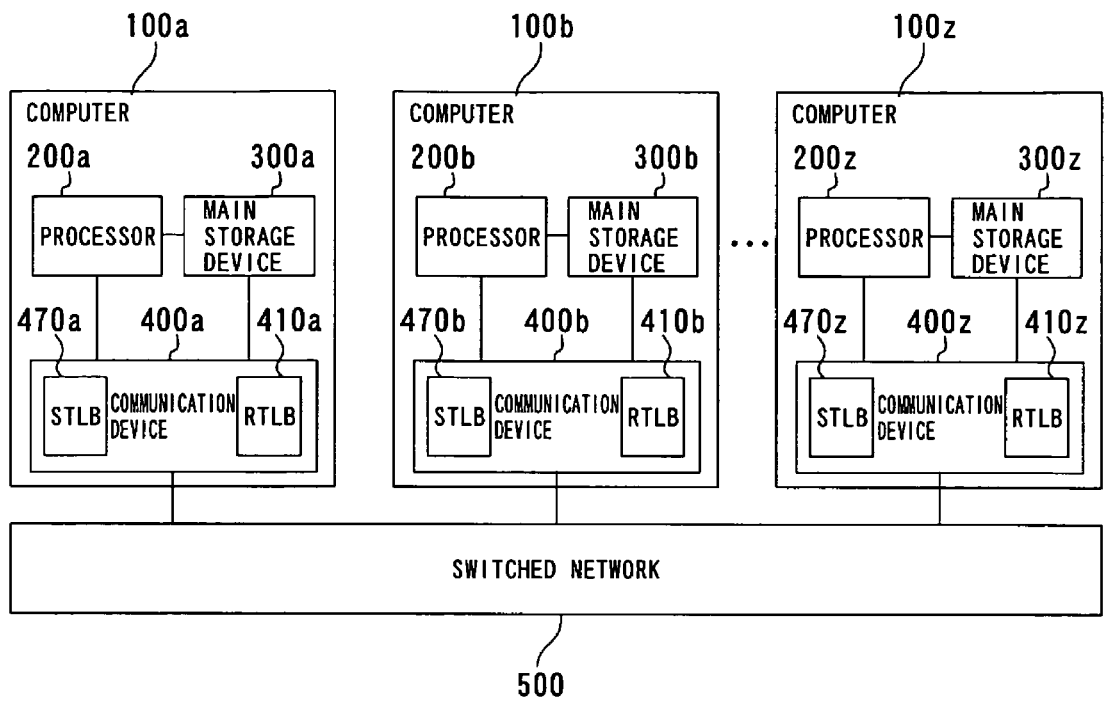
FIG. 1 is a block diagram showing a computer system to which the present invention is applied.

Referring first to FIG. 1, there is shown a configuration of a computer system to which the present invention is applied. The computer system shown includes computers $100a$ to $100z$ which are connected to each other through a packet switched network 500 to perform communication. Each of the computers $100a$ to $100z$ includes a processor $200a$ to $200z$ for issuing an instruction to perform an arithmetic operation process or a communication process, a main storage device $300a$ to $300z$ for retaining data to be used by the processor $200a$ to $200z$ to perform its processing, and a communication device $400a$ to $400z$ for processing a communication command from the processor $200a$ to $200z$ and performing a communication process through the packet switched network 500. Each of the communication devices $400a$ to $400z$ includes a receiving TLB (RTLB) $410a$ to $410z$ and a sending TLB (STLB) $410a$ to $410z$ for converting a logical address into a physical address.

Figure 12:
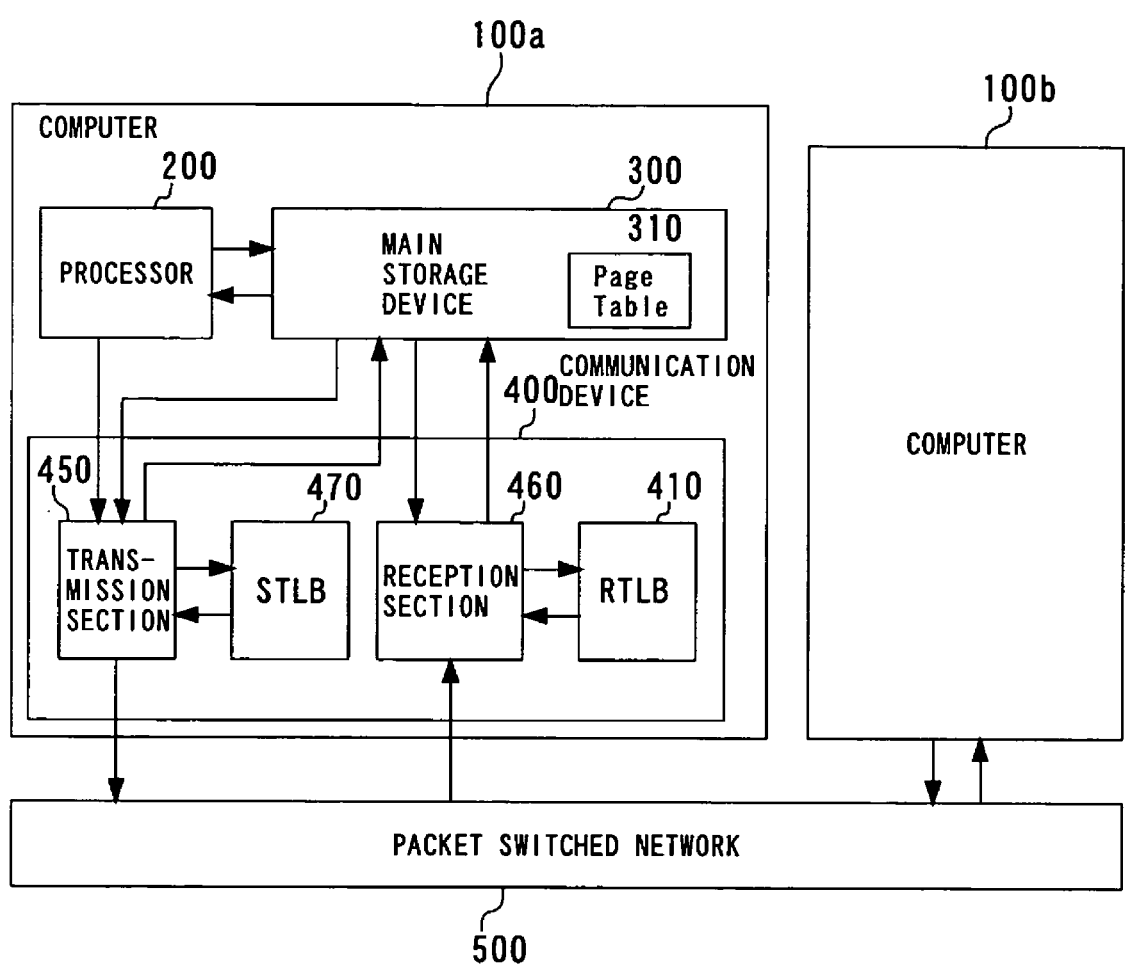
FIG. 12 is a block diagram showing an internal structure of a computer used in the computer system.

FIG. 12 shows an internal structure of the computers $100a$ to $100z$. In FIG. 12, the computers $100a$ and $100b$ are shown as representatives of the computers $100a$ to $100z$, and the internal structure only of the computer $100a$ is shown. Since all of the computers $100a$ to $100z$ operate similarly, in the following description, the processor $200a$, main storage device $300a$, page table $310a$ for address conversion in the main storage device $300a$, communication device $400a$, RTLB $410a$ and STLB $410a$ shown in FIG. 12 are denoted as processor 200, main storage device 300, page table 310, communication device 400, RTLB 410 and STLB 470, respectively.

The communication device 400 includes a transmission section 450, a STLB 470 which is a TLB for the transmission section 450, a RTLB 410 which is a TLB for a reception section, and a reception section 460.

The transmission section 450 extracts, in accordance with an instruction from the processor 200, a communication command from the main storage device 300 and converts a logical address of sending source data in the communication command into a physical address by means of the STLB 470 which retains part of stored contents of the page table 310. Then, the transmission section 450 extracts transmission data from the main storage device 300, produces a communication packet from the extracted data and the communication command, and transmits the communication packet to a designation computer through the packet switched network 500.

The STLB 470 temporarily stores a page entry including the physical address received from the transmission section 450 and page attributes extracted from the page table 310 in the main storage device 300 in order to convert the logical address into a physical address.

The RTLB 410 temporarily stores a page entry including a destination logical address in a communication packet and page attributes extracted from the page table 310 in the main storage device 300 in order to convert the destination logical address into a physical address.

The reception section 460 receives a communication packet from the packet switched network 500 and uses the RTLB 410 to perform conversion of a destination logical address into a destination physical address, and then writes data in the communication packet into the destination physical address of the main storage device 300.

The stored contents of the page table 310 are described with reference to FIG. 4. A page table is assured for each of processes which involve communication, and the page tables are disposed on the main storage device 300. Thus, the page tables 310 are used for conversion from a logical address into a physical address. Since a logical address is provided independently for each process, a page table 310 to be used is determined based on a process number. A logical address includes an offset in a page of a size determined in advance and a logical page number called Virtual Page Number (VPN).

For example, where the page size is 4 Kbytes while a logical address has 64 bits (63 to 0), the VPN indicates a first logical address portion (63-12) and the offset indicates a second logical address portion (11-0). The physical address after the address conversion includes the VPN replaced with a physical page number called PPN (Physical Page Number) and the offset which is not altered.

The page table 310 includes a plurality of page entries 330 wherein the VPN mentioned above indicates the page entry number of the TLB. In particular, if the VPN is 30, then the page entry of the 30th TLB is used. Each page entry 330 includes a physical page number (PPN) 320 which is a page number after the address conversion, a readability attribute 322 representing that the page after the address conversion is readable, a writability attribute 323 representing that the page is writable, and an entry validity flag 321 representing that the contents of the page entry are valid.

Figure 10:
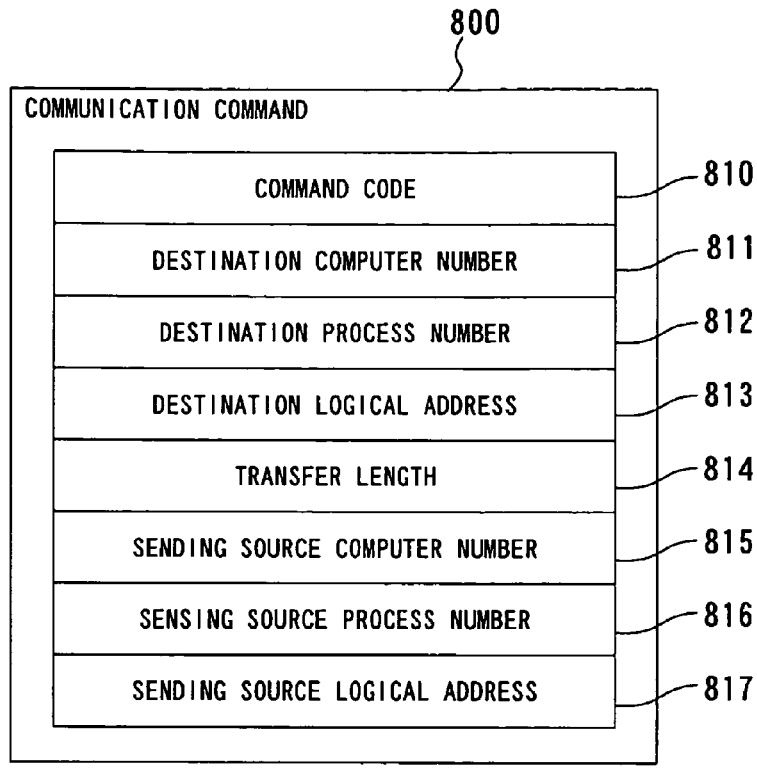
FIG. 10 is a diagrammatic view illustrating a format of a communication command used in the computer system.

FIG. 10 illustrates an example of a format of a communication command with which the processor 200 instructs the communication device 400.

One communication command 800 includes a command code 810 representative of a function code of the command, a destination computer number 811 representative of a destination computer, a destination process number 812 representative of a destination process, a destination logical address 813 representative of a write address of data in the destination process, a transfer length 814 representative of the length of the data to be transferred, a sending source computer number 815, a process number 816 representative of a process of the sending source, and a sending source address 817 representative of a logical address of the data to be transferred in a sending source process.

In the command code 810, where a logical address in the destination computer is to be designated, a function code of Remote DMA Write is designated, but where an address of the reception section which retains a logical address in the destination computer is to be used, a function code of Send is designated. Where the command code 810 indicates Send, the destination logical address 813 is invalid.

Figure 11:
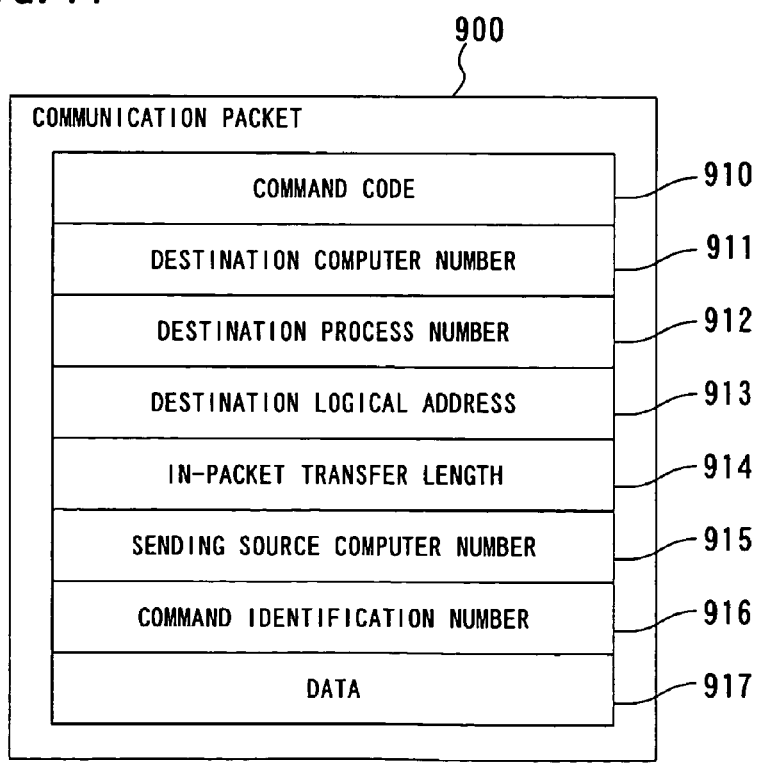
FIG. 11 is a similar view but illustrating a format of a communication packet used in the communication device.

FIG. 11 illustrates an example of a format of a communication packet which is transmitted from the communication device 400 which receives the communication command 800 illustrated in FIG. 10 to the packet switched network 500 or is received from the packet switched network 500 by the communication device 400.

One communication command 800 illustrated in FIG. 10 is transmitted divisionally in a plurality of communication packets 900 in order to assure the reliability of communication and simplify the structure of the communication device 400.

Referring to FIG. 11, each communication packet 900 includes a command code 910 to which the command code 810 of the communication command 800 is set, a destination computer number 911 to which the destination computer number 811 of the communication command 800 is set, a destination process number (PPID: Packet Process ID) 912 indicative of a process of an opposite party of communication to which the destination process number 812 of the communication command 800 is set, a destination logical address (PVA: Packet Virtual Address) 913 indicative of a writing destination of data in a destination process to which the destination logical address of the packet is set, an in-packet data length 914 to which the length of the data of the packet is set, a sending source computer number 915 for identification of a sending source to which the sending source computer number 815 of the communication command 800 is set, and data 917 for being written into the destination.

Where the communication command maximum simultaneous process number which indicates a number of processes simultaneously to the same destination from the transmission section 450 of the communication device 400 for transmission to the packet switched network 500 is set to two or more, the transmission section 450 adds a command identification number 916 indicative of an identification number of a command to be processed simultaneously to the communication packet to designate a TLB entry to be used by the reception section 460 thereby to raise the TLB hit ratio upon simultaneous processing of a plurality of communication commands to the same destination by the transmission section 450.

Figure 2:
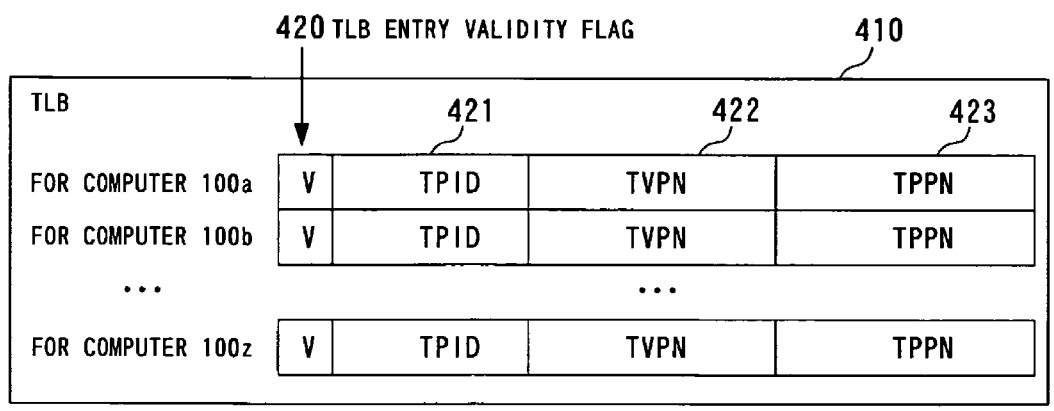
FIG. 2 is a diagrammatic view illustrating a configuration of a TLB used in the computer system.

FIG. 2 illustrates a configuration of the RTLB 410 incorporated in the communication device 400. Referring to FIG. 2, the RTLB 410 includes a plurality of TLB entries wherein one or a plurality of entries are prepared for each of sending source computers of received packets from the packet switched network 500. One TLB entry includes a TLB entry validity flag 420, a process number (TPID: TLB Process ID) 421, a virtual page number (TVPN: TLB Virtual Page Number) 422, and a physical page number (TPPN: TLB Physical Page Number) 423.

Figure 3:
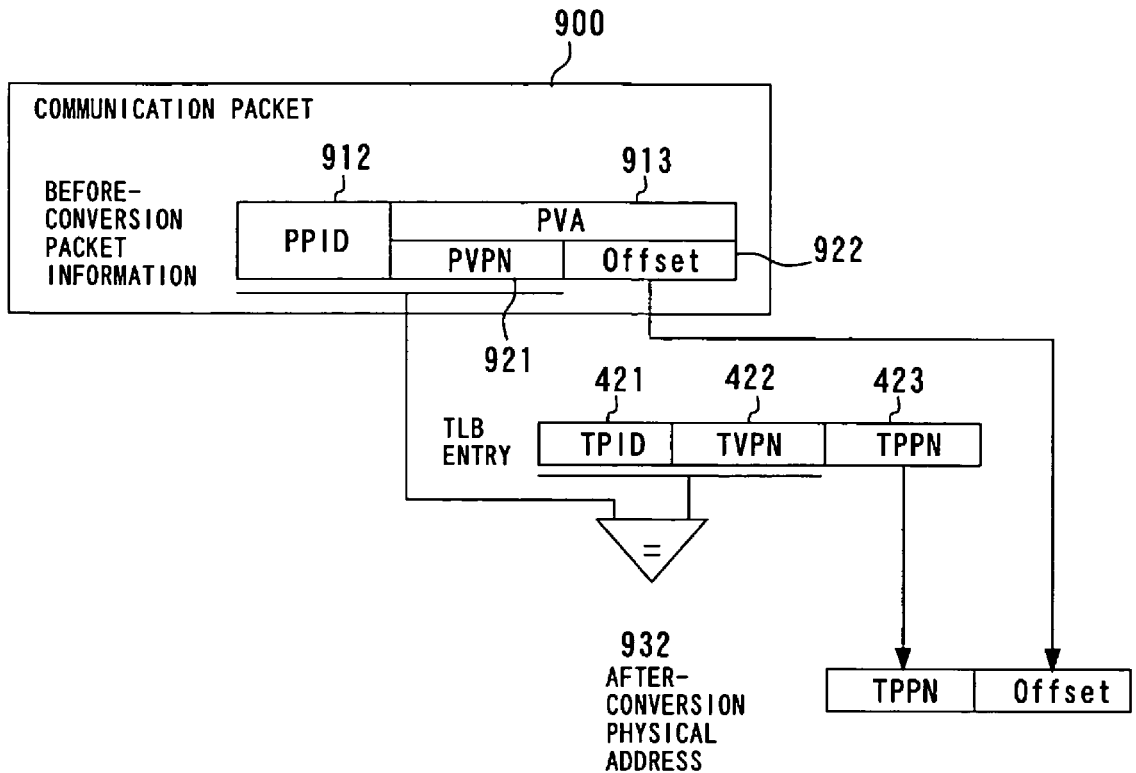
FIG. 3 is a diagrammatic view illustrating an address conversion method used in the computer system.

FIG. 3 illustrates an address conversion method of converting a logical address of the communication device 400 into a physical address.

The reception section 460 which accepts the communication packet 900 illustrated in FIG. 11 produces a physical address from the destination process number (PPID: Packet Process ID) 912 and the destination logical address 913 (PVA: Packet Virtual Address).

The destination logical address 913 includes a virtual page number (PVPN: Packet Virtual Page Number) 921 and an offset (Offset) 922. The destination process number 912 and the virtual page number 921 are compared with the process number 421 and the virtual page number 422 of a TLB entry corresponding to the communication packet 900, respectively. When both of two results of the comparison exhibit coincidence and the TLB entry validity flag 420 indicates validness, a TLB hit is detected and an after-conversion physical address 932 is produced from the physical page number 423 and the offset 922.

By the procedure described, address conversion from the destination process number 912 and the destination logical address 913 into the after-conversion physical address 932 is performed.

Figure 4:
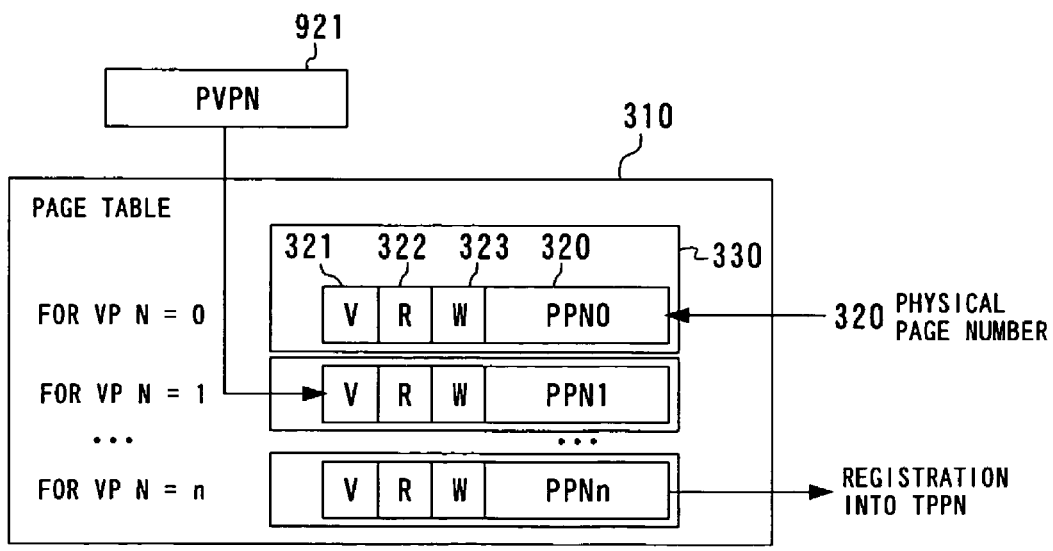
FIG. 4 is a diagrammatic view illustrating a configuration of a page table used in the computer system.

FIG. 4 illustrates an address conversion procedure where the results of comparison do not exhibit coincidence or where the TLB entry validity flag 420 does not indicate validness, that is, in the case of a TLB miss.

Software which uses the communication device 400 is assured in advance in a region in the main storage device 300 in which the page table 310 to be used for conversion from a logical address into a physical address can be accessed by the communication device 400. One page table is used for one process. The page table 310 includes a plurality of page entries 330, and one page entry is used for address conversion for one page and includes, for each value of the virtual page number 921 of a received packet which is part of a logical address to be converted, one PPN (Physical Page Number) 320, a readability attribute 322 indicating that the page is readable, a writability attribute 323 indicating that the page is writable, and an entry validity flag 321 indicating that contents of the page entry 330 are valid.

The physical address produced by the address conversion is a combination of the physical page number 320 and an offset which is an in-page address of the logical address. For example, where the logical address includes 64 bits and the page size is 4 Kbytes while the physical address includes 50 bits, the physical page number 320 is a first physical address portion (49-12) and the offset (11-0) forms a second physical address portion (11-0). Here, the representation in each parentheses represents the bit positions and "-" in the parentheses indicates the range of bits while the character on the left side of "-" indicates the most significant bit (MSB) and the character on the right side of "-" indicates the least significant bit (LSB). In short, (63-12) represents 52 bits from the bit position 63 to the bit position 12.

If such a TLB miss as described hereinabove occurs, then the communication device 400 registers the destination process number 912 and the virtual page number 921 of the communication packet 900 into the process number 421 and the virtual page number 422 of the entry with which the TLB miss has occurred. Then, the communication device 400 updates the page entry 330 read out from the page table 310 in accordance with the virtual page number 921 with the physical page number 423 of the TLB entry, and sets the value of the read out entry validity flag 321 to the TLB entry validity flag 420.

After the TLB entry validity flag 420 is set, the RTLB 410 is re-indexed with the communication packet 900.

The destination process number 912 and the virtual page number 921 in the communication packet 900 are registered in the process number 421 and the virtual page number 422, respectively, and when the TLB entry validity flag 420 indicates validness, the communication packet 900 hits on the TLB. Address conversion after the TLB hit by the re-indexing is similar to that upon the hit on the TLB upon the first time indexing. If the TLB entry validity flag 420 indicates invalidness, an exception of address conversion occurs and the packet is abandoned, or such an exception process as to issue a notification of illegality to the transmission source of the packet is performed.

Figure 5:
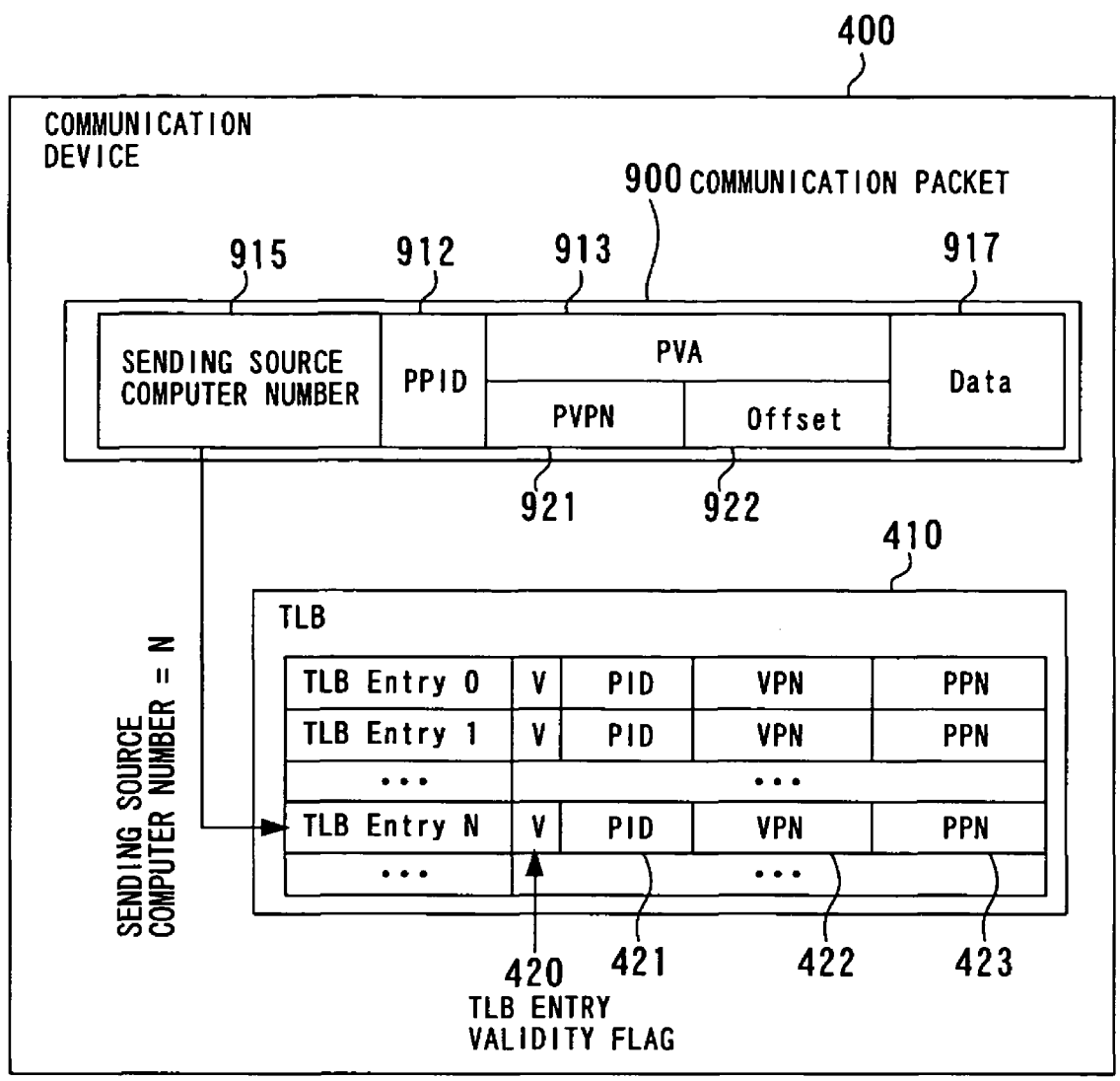
FIGS. 5 and 6 are diagrammatic views illustrating different TLB indexing methods used in the computer system.

FIG. 5 illustrates a method of calculating a TLB index address.

After the reception section 460 receives a communication packet 900 including the sending source computer number 915, destination process number 912, destination logical address 913 and the communication data (Data) 917 for being written into the destination, if the value of the sending source computer number 915 is N, then the TLB entry N is taken out.

The destination logical address 913 includes a virtual page number 921 and an Offset 922. The TLB entry N is a TLB entry assured exclusively for the sending source computer and is not driven out by communication from any other sending source computer. Where the characteristic of data transfer that the destination address in most cases increases monotonously is taken into consideration, the TLB entry continues to hit on the TLB entry N before the value of the virtual page number 921 is altered. By the TLB configuration described above, the TLB entry is not driven out by accessing from any other sending source computer.

Figure 6:
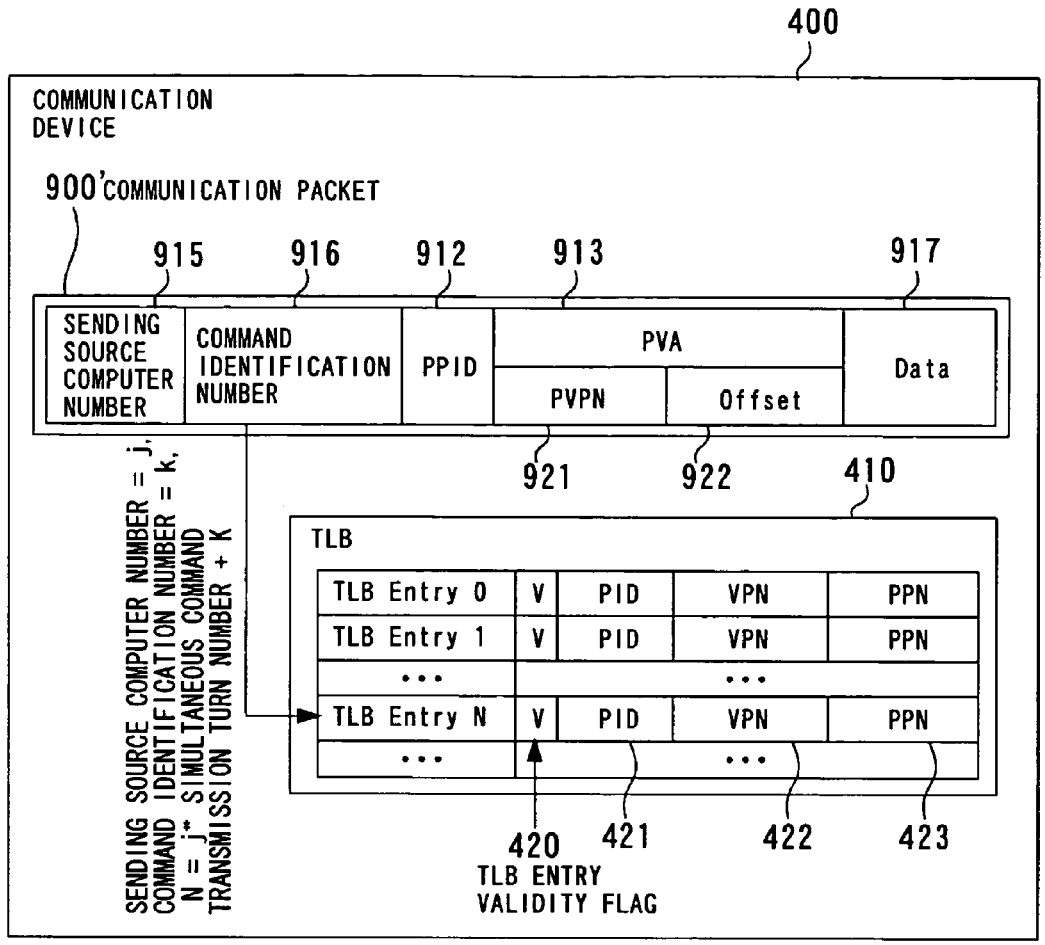

FIG. 6 illustrates another TLB indexing method wherein the transmission section 450 of the communication device 400 processes a plurality of communication commands to the same destination using the command identification number 916.

Referring to FIG. 6, a communication packet 900' used in the present TLB indexing method is characterized in that, to a communication packet 900 used in the TLB indexing method described hereinabove with reference to FIG. 5, a command identification number 916 of a communication command to be processed simultaneously to the same destination is added by the transmission section so that it may be used for production of an indexing address of a TLB. The present TLB indexing method is similar to that described with reference to FIG. 5 except that the command identification number 916 in the communication packet 900' is used for the TLB indexing address N.

The reception section 460 of the communication device 400 which receives the communication packet 900' calculates, where the value of the sending source computer number 915 is j and the value of the command identification number 916 is k while the number of communication commands to be processed simultaneously for the same destination by the transmission section of the communication device 400 is Pmax, the TLB indexing address N of the TLB entry in accordance with the following expression (1):

$$N = P\text{max} \times j + k \qquad (1)$$

Where the command identification number 916 of the communication packet 900' is used for the TLB indexing address N, even when communication packets produced with a plurality of commands are transmitted simultaneously in an exchanged order to the communication device 400 of the same destination computer from the transmission section 450 of the communication device 400, driving out of the TLB entry can be prevented, and the hit ratio of the TLB can be raised.

Figure 13:
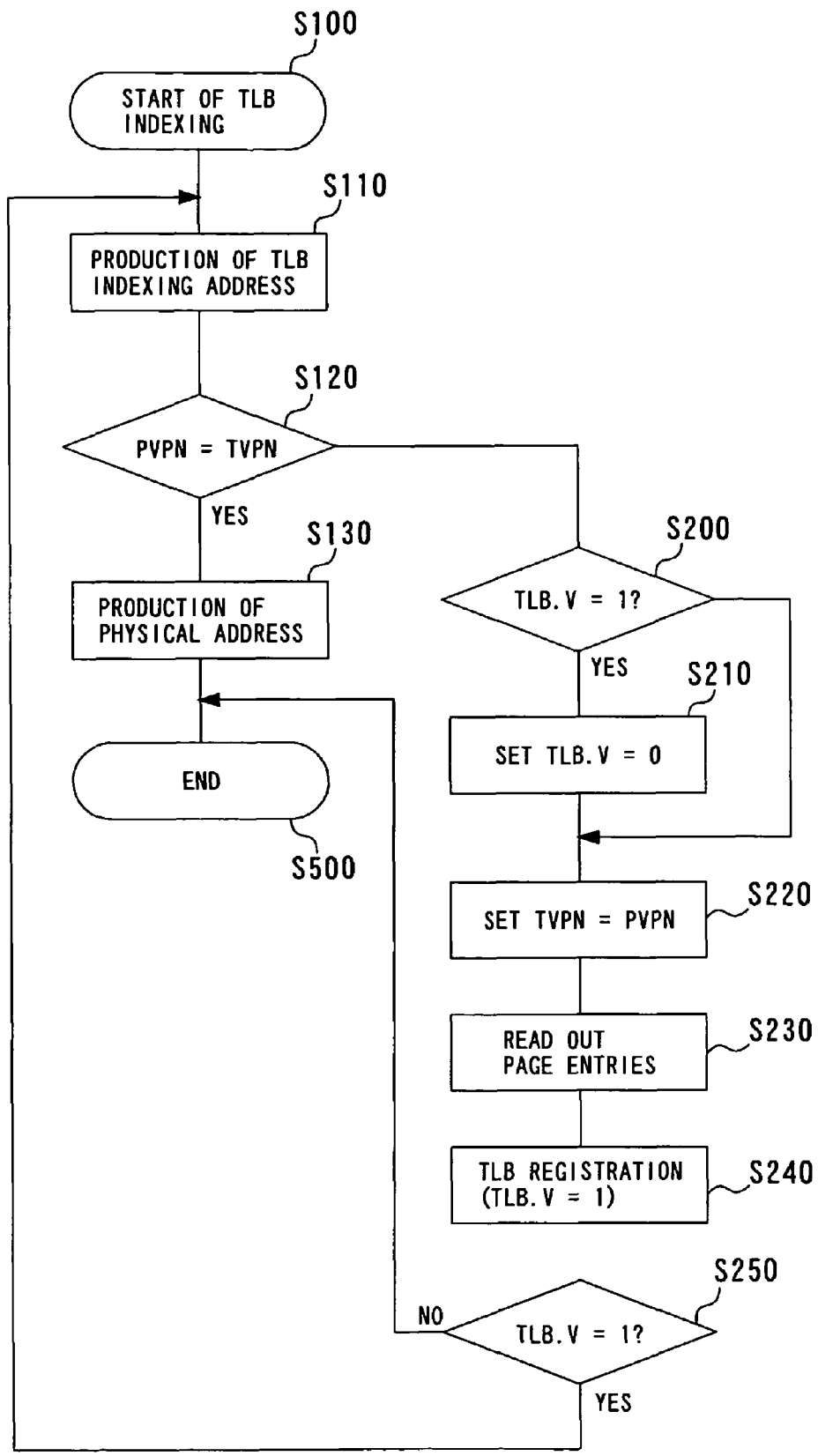
FIG. 13 is flow chart illustrating a TLB indexing and replacement process used in the computer system.

The TLB indexing and replacing operation is described below with reference to FIG. 13.

S100: Start of TLB indexing. A logical address conversion operation of the communication packet 900 received from the packet switched network 500 is started.

S110: An indexing address of the TLB is produced by "Production of TLB indexing address". Where the simultaneous process communication command number is represented by Pmax and the value of the communication command identification number 916 is represented by k while the sending source computer number is represented by j, from the expression (1) given hereinabove, $$TLB \text{ indexing address} = Pmax \times j + k$$

is obtained. A TLB entry registered in the TLB indexing address is determined as an object entry, and the following processes are executed for the object entry.

S120: A hit discrimination of a TLB is performed by "PVPN=TVPN?", and the destination process number PPID 912 of the received packet 900 and the virtual page number 921 which is a virtual page number of the destination logical address 913 are compared with the values of the process number TPID 421 and the virtual page number TVPN 422 of the object entry of the TLB, respectively. If coincidence is exhibited with both of the process number and the virtual page number and besides the TLB entry validity flag 420 indicates validness, then a TLB hit is detected and the processing advances to step S130. In any other case, a TLB miss is determined, and the processing advances to step S200.

The process just described is a process where the TLB is formed using the direct map method. Where the TLB is formed otherwise using the set associative method, in the comparison described above, the process numbers TPID and the virtual page numbers TVPN of the TLB entries of all sets are compared with the virtual page number PVPN and the destination process number PPID of the received packet, respectively. Where coincidence of one of the plural TLB entries is detected and besides the value of the TLB entry validity flag 420 of the TLB entry indicates validness, a TLB hit is determined, but when no such TLB hit is detected, a TLB miss is determined.

Further, where the TLB is formed otherwise using the full associative method, the comparison is performed similarly to that where the set associative method is used except that the virtual page numbers TVPN of all TLB entries and the virtual page number PVPN of the received packet are compared with each other.

S130: When a TLB hit is determined at the preceding step S120, a physical address is produced from the values of the physical page number TPPN 423 of the object entry of the TLB and the offset 922 which is an in-page address of the logical address of the received packet.

S500: The physical address conversion of the received packet is completed with the step S130, and the TLB operation is ended.

S200: When a TLB miss is determined at step S120, it is checked whether or not the TLB entry validity flag 420 of the TLB indicates validness. If the TLB entry validity flag 420 indicates validness, the processing advances to step S210, but in any other case, the processing advances to step S220.

S210: The TLB entry validity flag 420 of the object entry in the TLB is cleared to a value indicative of invalidness to invalidate the entry.

The description just above relates to a case wherein the TLB is formed using the direct map method. Where the TLB is formed otherwise using the set associative method or the full associative method, one entry is selected from among the plurality TLB entries using the least recently used method (LRU) or the like, and the TLB entry validity flag 420 of the selected entry is cleared to a value indicative of invalidness and the selected entry is determined as a processing object entry for later processing.

S220: The value of the virtual page number PVPN 921 of the received packet is set to the logical page number TVPN 422 of the object entry in the TLB.

S230: The page entry 330 is taken out from the page table 310. The page entry 330 is indexed with the virtual page number 921 of the received packet.

S240: The physical page number PPN 320 and the readability attribute 322 of an attribute flag, the writability attribute 323 and the entry validity flag 321 extracted from the page entry 330 are registered into the object entry of the TLB.

S250: Where the value of the entry validity flag 321 read out as described hereinabove indicates validness and the writability attribute 323 is "1", the processing advances to step S110 in order to perform indexing of the TLB again. On the other hand, where the value of the entry validity flag 321 indicates invalidness or where the writability attribute 323 is "0" and indicates that writing is impossible, the page conversion results in failure, and the processing advances to step S500 in order to abandon the received packet and end the processing.

Subsequently, the simultaneous parallel process of a plurality of communication commends to the same destination computer by the communication device 400 is described.

Figure 7:
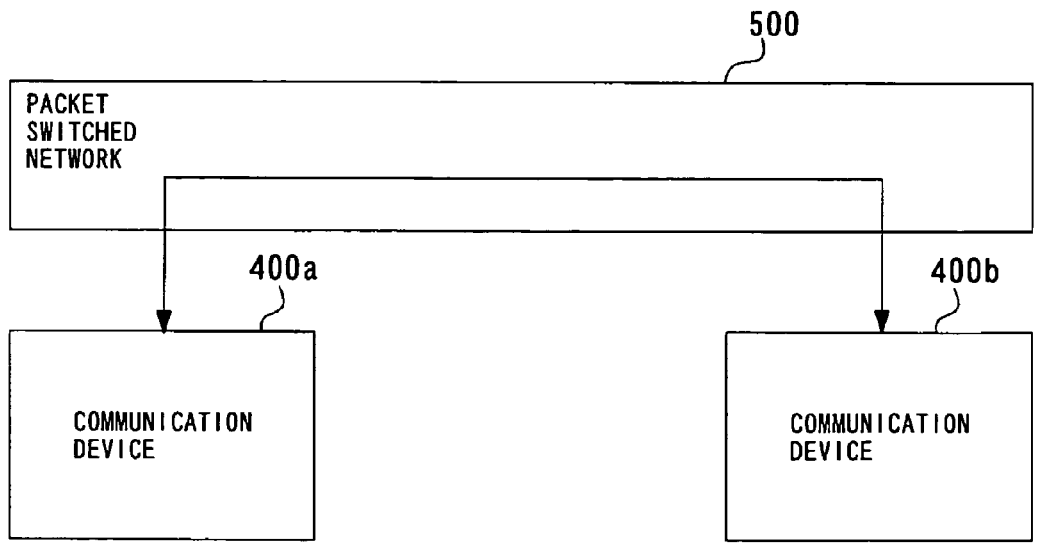
FIG. 7 is a diagrammatic view illustrating a communication method used in the computer system.

As seen in FIG. 7, a communication device 400a communicates with a communication device 400b through the packet switched network 500. FIG. 8 illustrates communication commands to be processed by the communication device 400a. In particular, the communication device 400a executes processes of communication commands 1 to 4 whose destination is the communication device 400b in accordance with a request from the processor. The communication commands 1, 2, 3 and 4 are divided into 5, 3, 3 and 1 packet, respectively, and sent to the communication device 400b through the packet switched network 500.

FIG. 14 illustrates an example of packet transmission where the communication packets formed from the plural communication commands are transmitted in the order of the communication commands from the communication device 400a to the communication device 400b through the packet switched network 500. The communication commands 1, 2, 3 and 4 transmit 5, 3, 3 and 1 packets, respectively.

Referring to FIG. 14, at the transmission turn numbers 1 to 5 in the transmission order, the communication command 1 is transmitted divisionally in five communication packets 1-1 to 1-5; at the transmission turn numbers 6 to 8, the communication command 2 is transmitted divisionally in three communication packets 2-1 to 2-3; at the transmission turn numbers 9 to 11, the communication command 3 is transmitted divisionally in three communication packets 3-1 to 3-3; and at the transmission turn number 12, the communication command 4 is transmitted in one communication packet 4-1. The last packets of the communication commands 1, 2, 3 and 4 are transmitted at the transmission turn numbers 5, 8, 11 and 12, respectively. In the example of FIG. 14, the simultaneous communication command process number is "2" and the communication packet internal command identification number assumes the value of 1 or 2, and the value of the identification number in the communication commands 1 and 3 is 1 while the value of the identification number in the communication commands 2 and 4 is 2.

FIG. 9 illustrates an example of transmission wherein the communication packets produced from the plural communication commands are transmitted in a complicated order from the communication device 400a to the communication device 400b through the packet switched network 500.

In the example illustrated in FIG. 9, the number of communication commands which can be processed simultaneously for the same destination by the communication device 400a is 2, and the incomplete communication command number of the production source of packets to be transmitted to the packet switched network 500 is "2" in the maximum. The incomplete communication command signifies a communication command whose last packet is not transmitted to the switched network. Further, the communication commands 1, 2, 3 and 4 of FIG. 9 are divided into the numbers of packets equal to those of the communication commands 1, 2, 3 and 4 of FIG. 14, respectively. In otherwords, the communication commands 1, 2, 3 and 4 transmit five, three, three and one packet, respectively.

At the transmission turn numbers 1 and 2 in the transmission order, the communication device 400a sets the command identification number of the communication packets 1-1 and 1-2 produced from the communication command 1 to "1" and sends the communication commands 1-1 and 1-2 to the packet switched network 500 thereby to place the command identification number "1" into a used state.

At the transmission turn numbers 3 and 4, while the communication device 400a has not sent out all packets of the communication command 1, since the communication commands 2-1 and 2-2 produced from the communication command 2 are ready and, even if the communication command 2 is processed, the simultaneous transmission command number remains within the simultaneous transmission command number limitation, the communication device 400a applies a command identification number different from the command identification number "1" already in a used state, that is, another command identification number "2", to the communication packets 2-1 and 2-2 and transmits the communication packets 2-1 and 2-2 to the packet switched network 500 thereby to place the command identification number "2" into a used state.

At the transmission turn number 5, the communication device 400a sends the communication packet 1-3 for the communication command 1.

At the transmission turn numbers 6, the communication device 400a sends the last communication packet 2-3 produced from the communication command 2 to the packet switched network 500. Since the communication packet 2-3 is the last packet produced from the communication command 2, the simultaneous communication command process number of the communication device 400a to the communication device 400b changes to 1 after the communication packet 2-3 is sent. Thus, it becomes possible to newly execute processing of another communication command to the communication device 400b, and the command identification number "2" is placed into an unused state.

At the transmission turn number 7, the communication device 400a newly starts processing of the communication command 3, and adds the communication identification number "2" which is an unused command identification number to the communication packet 3-1 and sends the communication packet 3-1 to the packet switched network 500. At the transmission turn numbers 8 and 9, the communication device 400a sends the communication packets 1-4 and 1-5 produced from the communication command 1. Since the communication packet 1-5 is the last communication command produced from the communication command 1, the packet transmission processing of the communication command 1 is completed and the simultaneous command process number of the communication device 400a to the communication device 400b changes to 1. Thus, the command identification number "1" is placed into an unused state.

At the transmission turn number 10, the communication device 400a sends the communication packet 3-2 of the communication command 2 to the packet switched network 500.

At the transmission turn number 11, the communication device 400a adds the unused command identification number "1" to the communication packet 4-1 newly produced by the processing of the communication command 4 and sends the communication packet 4-1 to the packet switched network 500. Since the communication packet 4-1 is the last communication packet of the communication command 4, the command identification number "1" is placed into an unused state.

At the transmission turn number 12, the last communication packet 3-3 of the communication command 3 is sent to the packet switched network 500, and the communication identification number "2" is placed into an unused state.

Subsequently, a process of the communication transmission section 450 which solves the problem of degradation of the TLB hit ratio caused by driving out of a TLB described hereinabove is described.

Taking it into consideration that data transfer is characterized in that, in one communication command, the destination logical address in most cases increases monotonously and that a predetermined number of TLB entries are secured for each sending source in the reception section for a communication packet, the transmission section 450 suppresses the number of communication commands to be processed simultaneously to the same destination to a number equal to or smaller than the limitation number described hereinabove to improve the TLB hit ratio. Further, in order to designate a TLB entry of the reception section 460 to be used by commands processed simultaneously by the transmission section 450, the command identification number 916 is added to each packet such that communication packets 900 produced with the same communication command 800 use the same TLB of the reception section 460 of the communication device 400.

Figure 17:
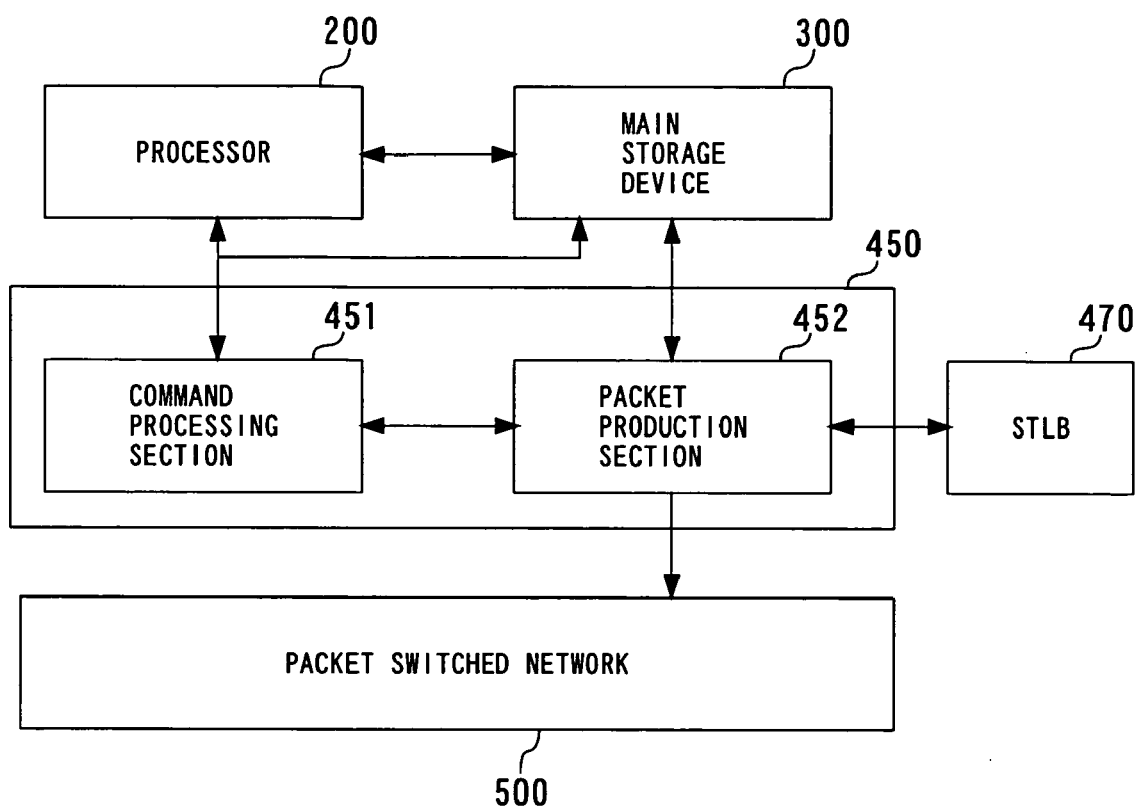
FIG. 17 is a block diagram particularly showing a configuration of a communication section of the communication device.

A configuration of the transmission section 450 is described in detail with reference to FIG. 17. The transmission section 450 includes a command processing section 451 for receiving a transmission command process starting instruction from the processor, extracting a transmission command from the main storage device 300 and transmitting the extracted transmission command to a packet production section packet production section 452. The packet production section 452 of the transmission section 450 receives the transmission command from the command processing section 451, converts a logical address of the transmission data buffer into a physical address using the STLB 470, reads out transmission data from the main storage device 300 using the physical address, produces a transmission packet from the read out data, and transmits the transmission packet to the packet switched network 500.

Figure 18:
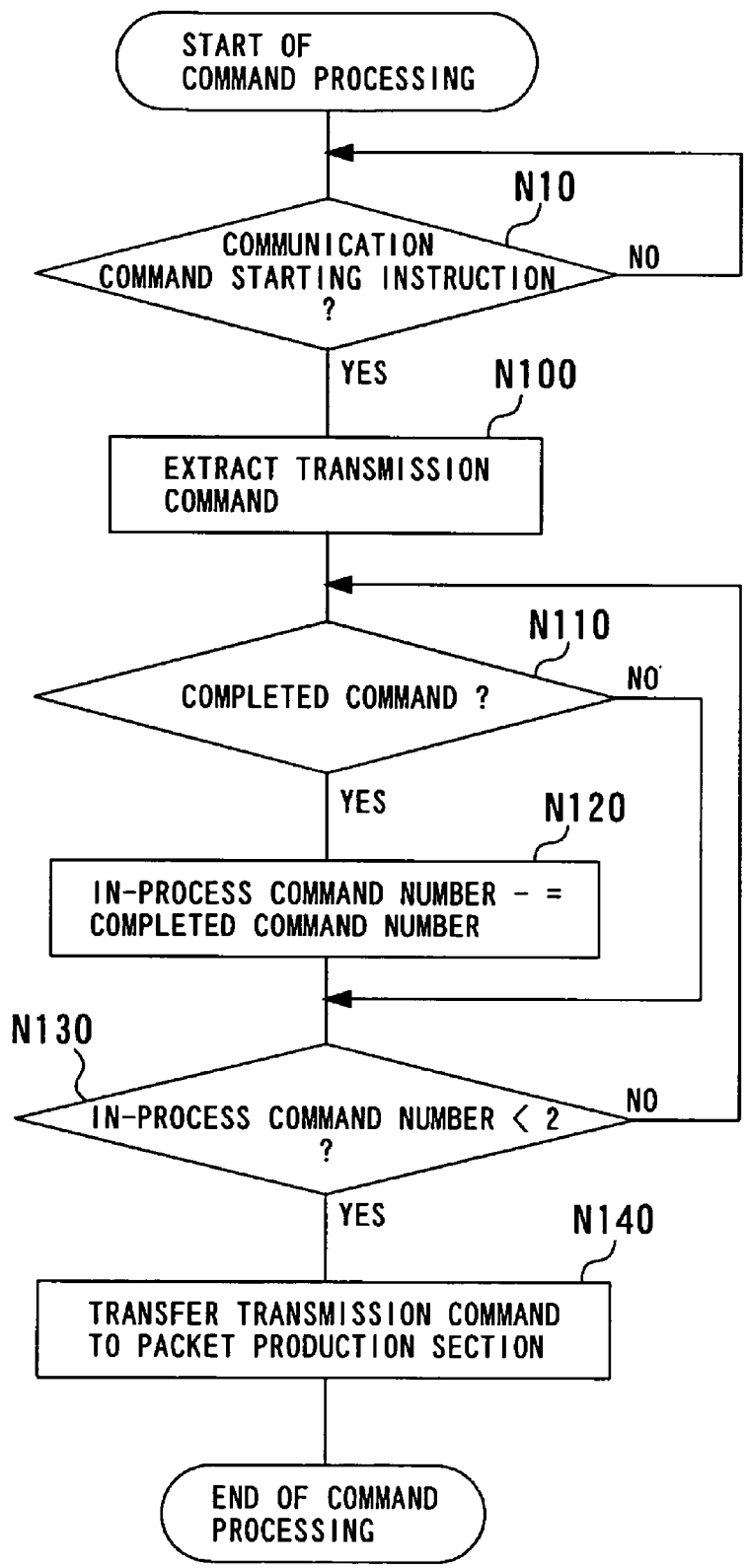
FIG. 18 is a flow chart illustrating operation of a transmission section of the communication device where the simultaneous transmission instruction number limitation is set to 2.

Operation of the transmission section 450 where the simultaneous transmission command number limitation is 2 is described in detail with reference to FIG. 18.

Start of command process: The initial value of the in-process command number is "0".

N10: If a communication command processing instruction is issued from the processor 200 to the command processing section 451, then the processing advances to step N100.

In any other case, the processing returns to step N10.

N100: The command processing section 451 extracts a transmission command from the main storage device 300.

N110: If a transmission command whose transmission is completed newly is included in those transmission commands whose transmission instruction to the packet production section 452 has been issued from the command processing section 451, then the processing advances to step N120. However, if a transmission command whose transmission is completed newly is not found, then the processing advances to step N130.

N120: The command processing section 451 receives a completion notification or notifications of a transmission command or commands from the packet production section 452 and subtracts the number of the completion notifications from the in-process command number in the command processing section 451. The "in-process command number—=completed command number" is a simplified representation of the in-process command number=in-process command number—completed command number.

N130: If the in-process command number is smaller than 2, then the processing advances to step N140. In any other case, the processing returns to step N110.

N140: The communication command is transferred from the command processing section 451 to the packet production section 452.

End of command process: The processing of the command processing section 451 for the one command is ended.

The packet production section 452 having received the transmission command from the command processing section 451 uses the STLB 470 to convert the destination logical address 813 in the communication command 800 into a physical address, extracts transmission data of the length of the transfer length 814 from the main storage device 300, divides the data into divisional data of a prescribed length, produces packets individually from the divisional data and transmits the packets to the packet switched network 500.

The simultaneous command issuance number limitation is restricted most significantly by the entry number of a TLB incorporated in hardware. In particular, the number of commands which can be processed simultaneously by the transmission section relies upon the numbers of entries of a TLB which can be incorporated on the reception side and the transmission side. If the transmission section holds a number of TLB entries equal to the number of commands which can be processed simultaneously, then a sufficient hit ratio of a TLB is obtained. On the reception side, if a number of TLB entries equal to the number defined by the number of commands which can be processed simultaneously×number of sending source computers is held, then a sufficient hit ratio of the TLB is obtained.

For example, if it is assumed that the simultaneously processed command number is 2 and 10 computers are connected through the packet switched network 500, then it is sufficient as the TLB entry number to the reception side if it incorporates 2×10=20 entries. Further, if the simultaneously processed command number is 1, then when transfer of data of a great data size is carried out, transfer of succeeding data of a smaller data size is obliged to wait for a long period of time. Therefore, the simultaneously processed command number is normally set to 2 or more.

Subsequently, an effect that the hit ratio is raised by the simultaneous command number limitation is described with reference to FIGS. 15 and 16.

First, operation of a reception side TLB where there is no simultaneous transmission command limitation is described in detail with reference to FIG. 15.

Figure 15:
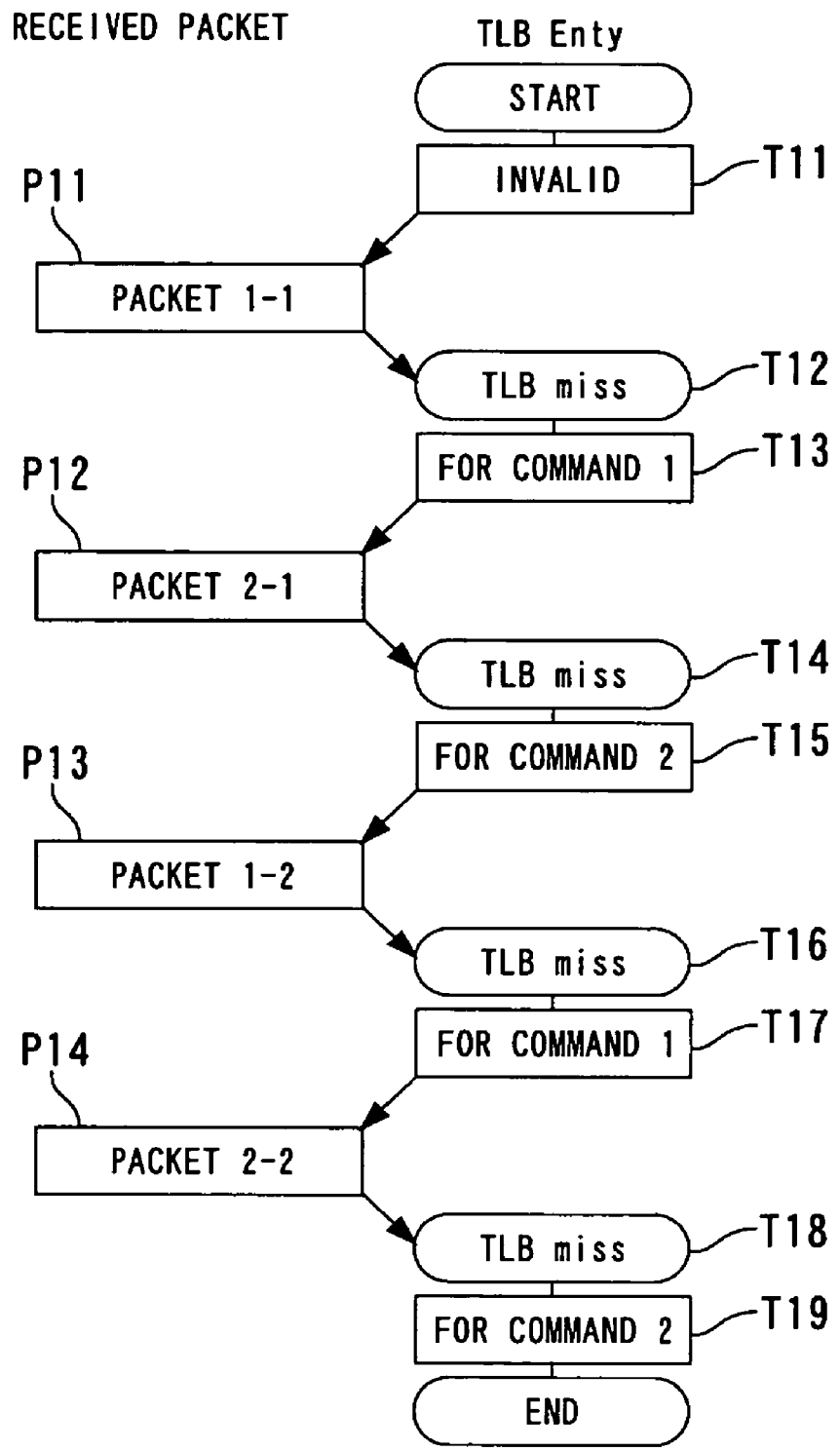
FIGS. 15 and 16 are diagrammatic views illustrating an effect that the hit ratio is improved by limitation to the number of simultaneous commands.

In particular, FIG. 15 illustrates operation where the TLB entry number on the reception side is 1 and the transmission command 1 produces two packets 1-1 and 1-2 while the transmission command 2 produces two packets 2-1 and 2-2 and consequently the transmission command 1 and the transmission command 2 individually transmit two packets. The destination addresses 813 of the transmission command 1 and the transmission command 2 use different pages from each other, and the packets 1-1 and 1-2 are transferred to addresses in the same page while the packets 2-1 and 2-2 are transferred to an address in the same page.

Start

T11: The TLB prior to reception of a packet is in an invalid state.

P11: The packet 1-1 is received.

T12: TLB miss (miss for the first time)

T13: Conversion information for the transmission command 1 is registered into the TLB.

P12: The packet 2-1 is received.

T14: TLB miss (miss for the second time). The transmission command 2 and the transmission command 1 use different pages from each other.

T15: Conversion information for the transmission command 2 is registered into the TLB.

P13: The packet 1-2 is received.

T16: TLB miss (miss for the third time). The transmission command 1 and the transmission command 2 use different pages from each other.

T17: Conversion information for the transmission command 1 is registered into the TLB.

P14: The packet 2-2 is received.

T18: TLB miss(miss for the fourth time). The transmission command 2 and the transmission command 1 use different paces from each other.

T19: Conversion information for the transmission command 2 is registered into the TLB End.

In the operation described above, a TLB miss occurs four times.

Operation of the reception side TLB where there is a simultaneous transmission command limitation is described in detail with reference to FIG. 16.

Figure 16:
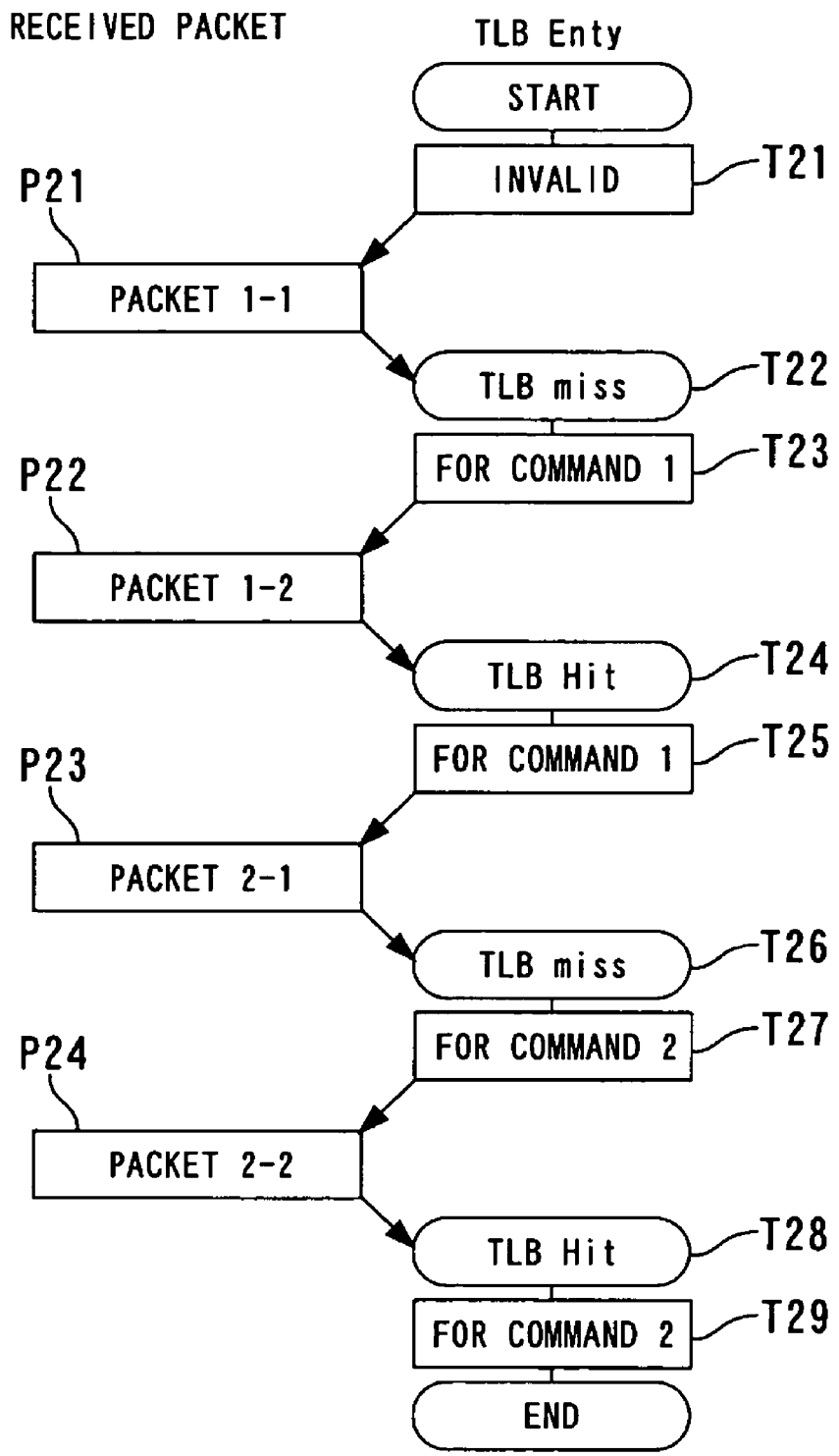

In particular, FIG. 16 illustrates operation where the conditions are similar to those in the case of FIG. 15 except that the simultaneous command limitation number of the transmission side is 1. In particular, FIG. 16 illustrates operation where the TLB entry number on the reception side is 1 and the transmission command 1 produces two packets 1-1 and 1-2 while the transmission command 2 produces two packets 2-1 and 2-2 and consequently the transmission command 1 and the transmission command 2 individually transmit two packets. The destination addresses of the transmission command 1 and the transmission command 2 use different pages from each other, and the packets 1-1 and 1-2 are transferred to addresses in the same page while the packets 2-1 and 2-2 are transferred to addresses in the same page.

Start

T21: The TLB prior to reception of a packet is in an invalid state.

P21: The packet 1-1 is received.

T22: TLB miss (miss for the first time)

T23: Conversion information for the transmission command 1 is registered into the TLB.

P22: The packet 2-1 is received.

T24: TLB hit (hit for the second time). The packet 1-1 and the packet 1-2 use the same page.

T25: Conversion information for the transmission command 2 is registered into the TLB.

P23: The packet 1-2 is received.

T26: TLB miss (miss for the second time). The transmission command 1 and the transmission command 2 use different pages from each other.

T27: Conversion information for the transmission command 2 is registered into the TLB.

P24: The packet 2-2 is received.

T28: TLB hit (hit for the second time). The packet 2-1 and the packet 2-2 use the same page.

T29: Conversion information for the transmission command 2 is already registered in the TLB.

End.

In the present operation described above, a TLB miss occurs twice, and a TLB hit occurs two times.

In FIG. 15 where there is no command number limitation, a TLB hit occurs 0 time with respect to four packets, that is, the TLB hit ratio is 0%. Meanwhile, in FIG. 16 where there is a command number limitation, a TLB hit occurs 2 times with respect to four packets, that is, the TLB hit ratio is 50%. Accordingly, an effect that the hit ratio is improved by the command number limitation is achieved.

While a preferred embodiment of the present invention has been described using specific terms, such description is for illustrative purposes only, and it is to be understood that changes and variations may be made without departing from the spirit or scope of the following claims.

What is claimed is:

1. An inter-computer data transfer method for transferring data between a plurality of computers each including a main storage device, a processor for issuing a communication process command and a communication device for processing the communication command from said processor and communicating with another one of said computers through a switched network, comprising the step of:

each of a transmission section and a reception section of said communication device including a translation look aside buffer for retaining a plurality of translation look aside buffer entries;

determining, when a communication command including information of that one of the computers which is a sending source is issued from said processor, one of the translation look aside buffer entries which is to be used in accordance with the computer of the sending source by means of said reception section, wherein the communication command further includes a destination computer number, a destination process number, a destination logical address, a transfer length representative of a length of data to be transferred, a sending source computer number, a sending source process number, and a sending source logical address, wherein the communication command is transmitted divisionally in a plurality of communication packets over the switched network, in order to assure reliability of communication, wherein an identification number of a processing command in the computer of the sending source is applied to a communication packet by said communication device, and for different communication packets which have the same identification number of the processing command, the same translation look aside buffer entry is used by said reception section of said communication device;

wherein said transmission section of said communication device extracts a communication command from said main storage device in accordance with an instruction from said processor, converts a logical address of data of the sending source in the communication command into a physical address, extracts transmission data from said main storage device, produces a communication packet from the extracted data and the communication command and transmits the communication packet to a destination computer; and wherein said reception section of said communication device receives a communication packet from said switched network, converts a destination logical address into a destination physical address for said main storage device and writes data in the communication packet into the destination physical address.

2. An inter-computer data transfer method as claimed in claim 1, wherein said transmission section of said communication device produces a communication packet including the information of the computer of the sending source and transmits the communication packet to another one of said computers.

3. An inter-computer data transfer method as claimed in claim 1, further comprising limiting the number of communication commands to be processed simultaneously to the same destination computer from the computer of the sending source, in order to increase a hit ratio of the translation look aside buffer.

4. An inter-computer network system, comprising:

a plurality of computers connected to each other through a switched network;

each of said computers including a main storage device, a processor for issuing a communication processing command, and a communication device for processing the communication command from said processor and communicating with another one of said computers through said switched network;

said communication device including a transmission section for transmitting a communication to said switched network and a reception section for receiving a communication from said switched network;

each of said transmission section and said reception section including a translation look aside buffer for retaining a plurality of translation look aside buffer entries;

said processor issuing the communication command which includes information of that one of the computers which is a sending source;

said reception section determining one of the translation look aside buffer entries which is to be used in accordance with the computer of the sending source, wherein the communication command further includes a destination computer number, a destination process number, a destination logical address, a transfer length representative of a length of data to be transferred, a sending source computer number, a sending source process number, and a sending source logical address, wherein the communication command is transmitted divisionally in a plurality of communication packets over the switched network, in order to assure reliability of communication, wherein said communication device applies an identification number of a processing command in the computer of the sending source to a communication packet, and said reception section uses the same translation look aside buffer entry for different communication packets which have the same identification number of the processing command;

wherein said transmission section of said communication device extracts a communication command from said main storage device in accordance with an instruction from said processor, converts a logical address of data of the sending source in the communication command into a physical address, extracts transmission data from said main storage device, produces a communication packet from the extracted data and the communication command and transmits the communication packet to a destination computer; and wherein said reception section of said communication device receives a communication packet from said switched network, converts a destination logical address into a destination physical address for said main storage device and writes data in the communication packet into the destination physical address.

5. An inter-commuter network system as claimed in claim 4, wherein said transmission section produces a communication packet including the information of the computer of the sending source and transmits the communication packet to another one of said computers.

6. An inter-commuter network system as claimed in claim 4, wherein said communication device limits the number of communication commands to be processed simultaneously to the same destination computer from the computer of the sending source.

7. An inter-computer network system as claimed in claim 5, wherein the communication packet includes a command code for setting a communication command, a destination computer number for setting a destination computer number for the communication command, a process number representative of a process of a communication opposite party for setting the destination process number of the communication command, a destination logical address representative of a writing destination of the data in the destination process for setting the destination logical address for the packet, a data length for setting a length of data of the packet, a sending source computer number for identification of a sending source for setting a sending source computer number of the communication command, a command identification number, and data to be written into the destination.

8. An inter-computer data transfer method as claimed in claim 1, wherein the communication command further includes a communication command maximum simultaneous process number that indicates a number of processes simultaneously to a same destination, for transmission over the switched network, wherein when the communication command maximum simultaneous process number is two or more, the transmission section adds a command identification number indicative of an identification number of a command to be processed simultaneously to each of the communication packets to designate a translation lookaside buffer entry to be used by the reception section.

9. An inter-computer data transfer system as claimed in claim 4, wherein the communication command further includes a communication command maximum simultaneous process number that indicates a number of processes simultaneously to a same destination, for transmission over the switched network, wherein when the communication command maximum simultaneous process number is two or more, the transmission section adds a command identification number indicative of an identification number of a command to be processed simultaneously to each of the communication packets to designate a translation lookaside buffer entry to be used by the reception section.

10. An inter-computer data transfer system as claimed in claim 4, further comprising:

means for suppressing a number of communication commands to be processed simultaneously to a same destination.

11. An inter-computer data transfer method for transferring data between a plurality of computers each including a main storage device, a processor for issuing a communication process command and a communication device for processing the communication command from said processor and communicating with another one of said computers through a switched network, comprising the steps of:

each of a transmission section and a reception section of said communication device including a translation look aside buffer for retaining a plurality of translation look aside buffer entries;

determining, when a communication command including information of that one of the computers which is a sending source is issued from said processor, one of the translation look aside buffer entries which is to be used in accordance with the computer of the sending source by means of said reception section, wherein said processor does not carry out any address conversion but instead sends out the communication command and a logical address to said communication device, wherein an identification number of a processing command in the computer of the sending source is applied to a communication packet by said communication device, and for different communication packets which have the same identification number of the processing command, the same translation look aside buffer entry is used by said reception section of said communication device;

wherein said transmission section of said communication device extracts a communication command from said main storage device in accordance with an instruction from said processor, converts a logical address of data of the sending source in the communication command into a physical address, extracts transmission data from said main storage device, produces a communication packet from the extracted data and the communication command and transmits the communication packet to a destination computer; and wherein said reception section of said communication device receives a communication packet from said switched network, converts a destination logical address into a destination physical address for said main storage device and writes data in the communication packet into the destination physical address.

12. An inter-computer data transfer method as claimed in claim 11, wherein said transmission section of said communication device produces a communication packet including the information of the computer of the sending source and transmits the communication packet to another one of said computers.

13. An inter-computer data transfer method as claimed in claim 11, further comprising limiting the number of communication commands to be processed simultaneously to the same destination computer from the computer of the sending source, in order to increase a hit ratio of the translation look aside buffer.

14. An inter-computer network system, comprising:

a plurality of computers connected to each other through a switched network;

each of said computers including a main storage device, a processor for issuing a communication processing command, and a communication device for processing the communication command from said processor and communicating with another one of said computers through said switched network;

said communication device including a transmission section for transmitting a communication to said switched network and a reception section for receiving a communication from said switched network;

each of said transmission section and said reception section including a translation look aside buffer for retaining a plurality of translation look aside buffer entries;

said processor issuing the communication command which includes information of that one of the computers which is a sending source;

said reception section determining one of the translation look aside buffer entries which is to be used in accordance with the computer of the sending source, wherein said processor does not carry out any address conversion but instead issues out the communication command and a logical address to said communication device; and wherein an identification number of a processing command in the computer of the sending source is applied to a communication packet by said communication device, and for different communication packets which have the same identification number of the processing command, the same translation look aside buffer entry is used by said reception section of said communication device;

wherein said transmission section of said communication device extracts a communication command from said main storage device in accordance with an instruction from said processor, converts a logical address of data of the sending source in the communication command into a physical address, extracts transmission data from said main storage device, produces a communication packet from the extracted data and the communication command and transmits the communication packet to a destination computer; and wherein said reception section of said communication device receives a communication packet from said switched network, converts a destination logical address into a destination physical address for said main storage device and writes data in the communication packet into the destination physical address.

15. An inter-commuter network system as claimed in claim 14, wherein said transmission section produces a communication packet including the information of the computer of the sending source and transmits the communication packet to another one of said computers.

* * * * *